United States Patent
Le et al.

(10) Patent No.: US 10,476,400 B1
(45) Date of Patent: Nov. 12, 2019

(54) DUAL-COMPARATOR CURRENT-MODE RECTIFIER

(71) Applicant: Avago Technologies International Sales Pte. Limited, Singapore (SG)

(72) Inventors: Jim Le, Fort Collins, CO (US); Mark Rutherford, Fort Collins, CO (US); Ashfaqur Rahman, Fort Collins, CO (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 16/179,839

(22) Filed: Nov. 2, 2018

(51) Int. Cl.
  *H02M 3/335* (2006.01)
  *H02M 7/162* (2006.01)
  *H04B 5/00* (2006.01)
  *H02J 50/12* (2016.01)

(52) U.S. Cl.
  CPC .......... *H02M 7/1623* (2013.01); *H02J 50/12* (2016.02); *H02M 3/335* (2013.01); *H04B 5/0075* (2013.01)

(58) Field of Classification Search
  None
  See application file for complete search history.

(56) References Cited

U.S. PATENT DOCUMENTS

| | | | | |
|---|---|---|---|---|
| 2009/0135531 A1* | 5/2009 | Hirata | ..................... | H02H 3/093 361/18 |
| 2010/0202172 A1* | 8/2010 | Skirda | ................ | G05D 23/1909 363/89 |
| 2013/0043818 A1* | 2/2013 | Chang | ....................... | H02P 6/16 318/400.34 |
| 2013/0147278 A1* | 6/2013 | Arisawa | .................... | H02P 8/12 307/75 |
| 2013/0176758 A1* | 7/2013 | Tseng | .................... | H02M 7/219 363/89 |
| 2014/0240029 A1* | 8/2014 | Peng | ........................ | H02M 1/38 327/423 |
| 2015/0207338 A1* | 7/2015 | Uchimoto | ............... | H02J 7/025 307/104 |
| 2015/0364998 A1* | 12/2015 | North | ................... | H03K 17/133 323/271 |

* cited by examiner

*Primary Examiner* — Jeffrey A Gblende
(74) *Attorney, Agent, or Firm* — Morgan, Lewis & Bockius LLP

(57) ABSTRACT

A dual-comparator rectifier circuit of a wireless power receiver includes a receive coil configured to generate a current in response to receiving power through electromagnetic waves from a wireless power transmitter and a bridge circuit. The bridge circuit includes four branches, and one node of each of the four branches is coupled to one of a first node or a second node of the receive coil. A first branch and a second branch of the four branches are coupled to the first node and the second node of the receive coil and include a first circuit and a second circuit, respectively. The first circuit includes a first comparator and a first switch circuit and the second circuit includes a second comparator and a second switch circuit. The first circuit and the second circuit can set a dynamic turn-on threshold for the first switch circuit and the second switch circuit, respectively.

18 Claims, 6 Drawing Sheets

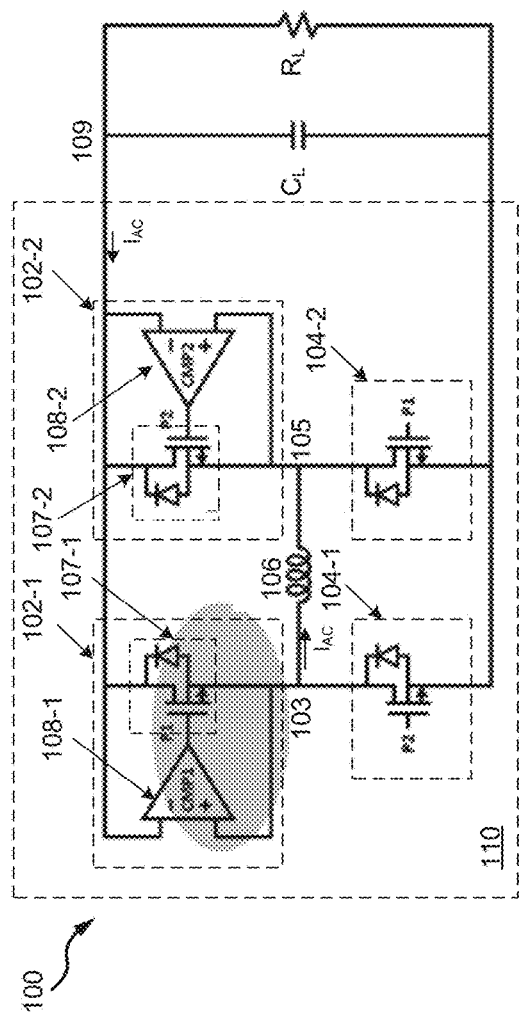
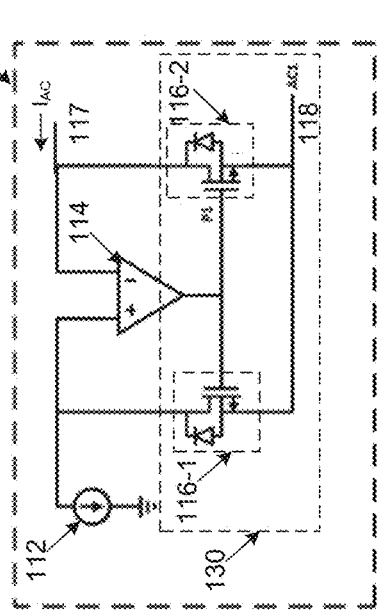
FIG. 1A
FIG. 1B

DUAL-COMPARATOR CURRENT-MODE RECTIFIER

TECHNICAL FIELD

The present description relates generally to integrated circuits and, more particularly, to a dual-comparator, current-mode rectifier with dynamic turn-on threshold for wireless receiver applications.

BACKGROUND

Wireless Power Transfer (WPT) enables supplying power through an air gap, without the need for current-carrying wires. WPT can provide power from an AC source to a compatible device without physical connectors or wires. WPT can recharge many devices, such as portable communication devices including mobile phones, tablets, and other electronic devices. WPT can use electromagnetic fields created by charged particles to carry energy between transmitters and receivers over an air gap. The air gap is bridged by converting the energy into electromagnetic (EM) waves such as radio waves, microwaves or even light that can travel through the air. The electromagnetic waves are transmitted over the air, and are then received and converted into usable electrical current by a wireless power receiver.

In wireless power receivers, a rectifier circuit can be used to convert inductively coupled AC power from a receive coil into the DC power needed by the receiver subsystem. In a typical implementation an integrated rectifier may include four power field-effect transistors (FETs) used in an H-bridge configuration around a receive coil. Internal comparators may monitor the AC signal and turn the FETs on and off accordingly. For maximum efficiency, the threshold setting may be set such that the FETs can turn on and off quickly. The key challenge for the integrated rectifier is to accurately sense the AC signal and reliably turn on and off in the presence of system noise and ringing due to resonances of the receive coil.

BRIEF DESCRIPTION OF THE DRAWINGS

Certain features of the subject technology are set forth in the appended claims. However, for purposes of explanation, several embodiments of the subject technology are set forth in the following figures.

FIGS. 1A and 1B are diagrams illustrating examples of a dual-comparator current-mode rectifier, in accordance with one or more aspects of the subject technology.

DETAILED DESCRIPTION

Figure 2A:
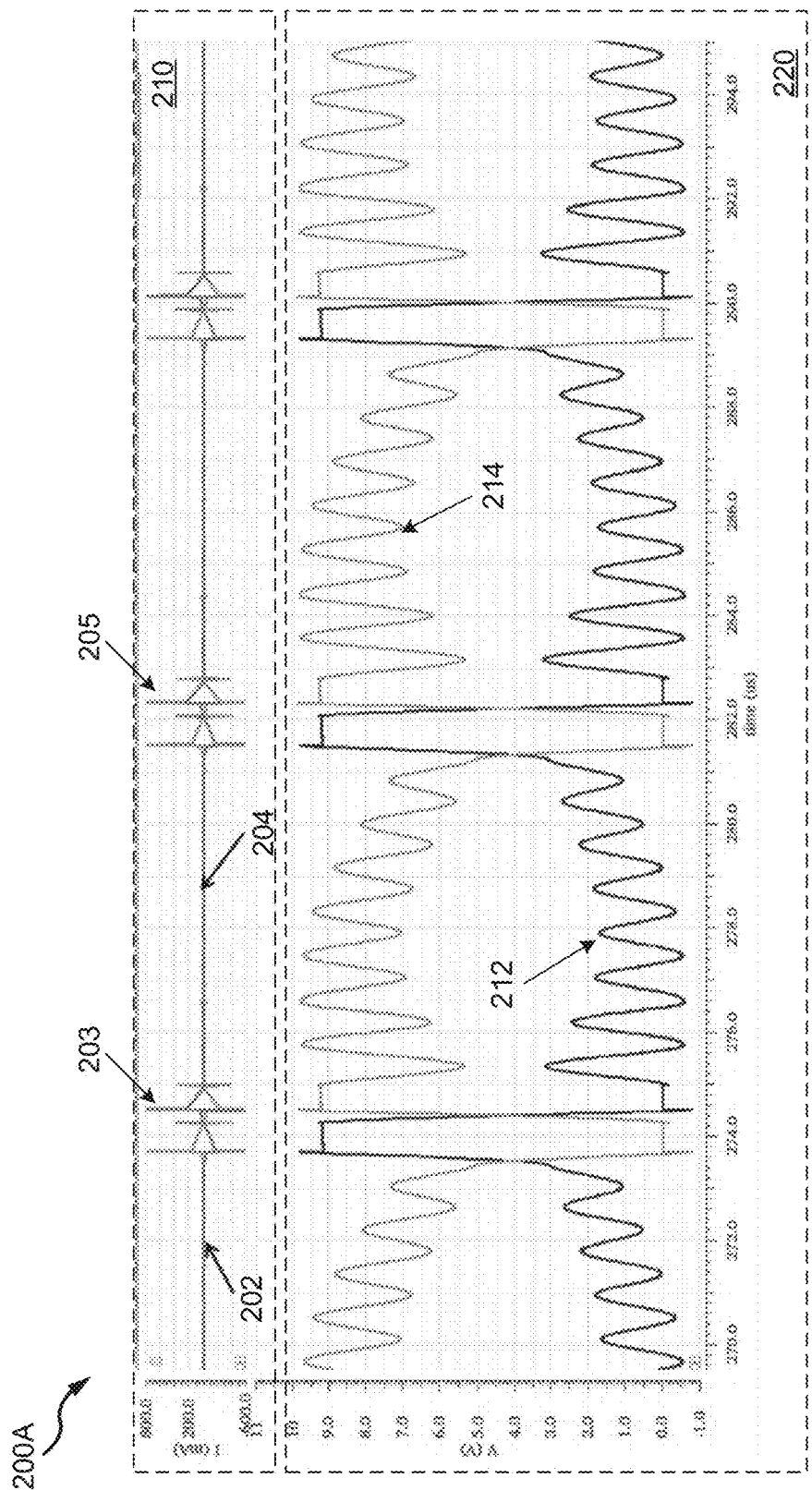
FIGS. 2A and 2B are charts illustrating examples of current and voltage waveforms of a dual-comparator, current-mode rectifier, in accordance with one or more aspects of the subject technology.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

The subject technology is directed to circuits to a dual-comparator, current-mode rectifier with dynamic turn-on threshold for wireless receiver applications. The dual-comparator, current-mode rectifier of the subject technology includes true current-mode switching with a sense replica as further described herein. The disclosed dual-comparator, current-mode rectifier implements a dynamic turn-on threshold value, where a chosen initial turn-on threshold value allows a fast turn on. The turn-on threshold value is dynamically increased after the initial turn-on to provide additional hysteresis and to prevent fast triggering due to the resonance current. The turn-on threshold value can be reset to its original low value at the end of each cycle.

The dual-comparator, current-mode rectifier of the subject technology includes a number of advantageous features. For example, the disclosed dual-comparator, current-mode rectifier has well-defined states across many operating conditions, without any unsafe or indeterminate states. In other words, the system is always aware of the correct switching times. Further, the current-mode switching and dynamic threshold features of the subject dual-comparator, current-mode rectifier can eliminate the need for measures such as one-time on or minimum on-time measures. The disclosed dual-comparator, current-mode rectifier can be implemented with a smaller chip area, as it only uses two comparators as compared to conventional four-comparator rectifiers, and with less overhead for level-shifters, protection logic and synchronization logic and references on the flying domains. Additionally, the lower power consumption of the subject dual-comparator, current-mode rectifier can translate into a higher efficiency, as described in more detail herein.

FIGS. 1A and 1B are diagrams illustrating examples of a dual-comparator, current-mode rectifier 100, in accordance with one or more aspects of the subject technology. The dual-comparator, current-mode (CM) rectifier (hereinafter "CM rectifier") 100 includes a bridge circuit 110 (e.g., H-bridge) coupled to a receive coil 106. The bridge circuit 110 includes four branches, and a first branch and a second branch of the four branches are coupled to the first node 103 and the second node 105 of the receive coil 106, respectively. The first branch and the second branch are similar and include a first comparator circuit (hereinafter "first circuit") 102-1 and a second comparator circuit (hereinafter "second circuit") 102-2. The third branch and the fourth branch are coupled to the first node 103 and the second node 105 of the receive coil 106. The third branch and the fourth branch are similar to one another and include a first field-effect transistor (FET) switch 104-1 and a second FET switch 104-2, respectively.

The receive coil 106 can couple to a transmit coil of a wireless power transmitter to receive an AC current ($I_{AC}$). The bridge circuit 110 can rectify the AC current $I_{AC}$, and the rectified current is then filtered by a capacitor CL and delivered to a load RL. The first circuit 102-1 and the second circuit 102-2 include comparators 108-1 and 108-2. The output nodes of the comparators 108-1 and 108-2 (nodes P1 and P2) can control gate voltage of accompanying FET switches 107-1 and 107-2. Further, as shown in FIG. 1A, a gate terminal of the FET switch 104-1 (node P2) is controlled by the output node of the comparator 108-2, and a gate terminal of the FET switch 104-2 (node P2) is controlled by the output node of the comparator 108-1. This allows the third branch to follow the second branch, and the fourth branch to follow the first branch in conducting current.

In some implementations, each of the first circuit 102-1 and the second circuit 102-2 can be realized using the comparator circuit 120 shown in FIG. 1B. The comparator circuit 120 includes a reference current source 112, a comparator 114 and a differential pair of FET switches 130. The reference current source 112 is coupled between a first (+) input node of the comparator 114 and a ground potential. The differential pair of FET switches 130 includes FET switches 116-1 and 116-2 that are shown with their respective inherent body-drain diodes. The common source terminal of the FET switches 116-1 and 116-2 is a node 118 of the comparator circuit 120 that can be connected to one of first and second nodes 103 or 105 of the receive coil 106. The common gate terminal of the FET switches 116-1 and 116-2 is coupled to an output node of the comparator 114. The drain terminals of the FET switches 116-1 and 116-2 are coupled to the first (+) and second (−) input nodes of the comparator 114, and the second (−) input nodes of the comparator 114 is coupled to a node 117 of the comparator circuit 120 that can in turn be connected to an output node 109 of the bridge circuit 110.

The FET switch 116-1 is a sense FET and is substantially smaller (e.g., by a factor within a range of 1,000-10,000) than the FET switch 116-2, which is a power FET. The sense FET 116-1 and the power FET 116-2 have a shared gate connection that allows the sense FET 116-1 track the operating mode of the power FET 116-2. The drain current of the sense FET 116-1 is limited by the reference current source 112 (e.g., having a current $I_{ref}$ within a range of about 10-20 μA), and the drain current of the power FET 116-2 is the same as the AC current $I_{AC}$ provided to the filter. The threshold of the comparator is based on a current through the power FET 116-2, which is proportional to the $I_{ref}$ of the reference current source 112. The comparator 114 compares the Vds voltage of the sense FET 116-1 and the Vds voltage of the power FET 116-2, but, effectively, comparator 114 is comparing the $I_{AC}$ of the power FET 116-2 with the $I_{ref}$ of the reference current source 112. It is understood that when the power FET 116-2 is off, the Vds of the sense FET 116-1 reflects a body diode (for a turn-on threshold), and when the power FET 116-2 is on the Vds of the sense FET 116-1 reflects a FET on-resistance (for a turn-off threshold).

It should be emphasized that, in stark contrast with the existing solution, the turn-on threshold for the disclosed solution is a dynamic threshold that is initially set to a low value to achieve fast turn-on and then increased. The turn-on threshold is increased after the initial turn on (e.g., retrigger threshold) to provide additional comparator hysteresis and to prevent false triggering due to a resonance current. The resonant current can flow through the receive coil due to a parasitic capacitance of the receive coil. The turn-on threshold can be set to the original low value at the end of each cycle.

Although the implementation described in FIGS. 1A and 1B is for a specific arrangement of the bridge circuit 110 in which the comparator circuits 102 are used in upper branches of the bridge circuit 110 are described above, in other implementations other arrangements of the branches of the bridge circuit 110 with different combinations of comparator circuits 102 and the FET switches 104 in those branches can be realized.

In one or more implementations, the four branches can be realized using comparator circuits similar to comparator circuits 102 and the on threshold and off threshold can be split between pairs of comparator circuits. For instance, comparator circuits used in the first and second branches of the bridge circuit 110 can control the on threshold and the comparator circuits used in the third and fourth branch of the bridge circuit 110 can control the off threshold.

The existing solution employs an H-bridge that uses comparators in all four branches. Accordingly, the subject technology has the advantage of using only two comparators that can save chip area, and operate with higher efficiency and lower power consumption.

Figure 2B:
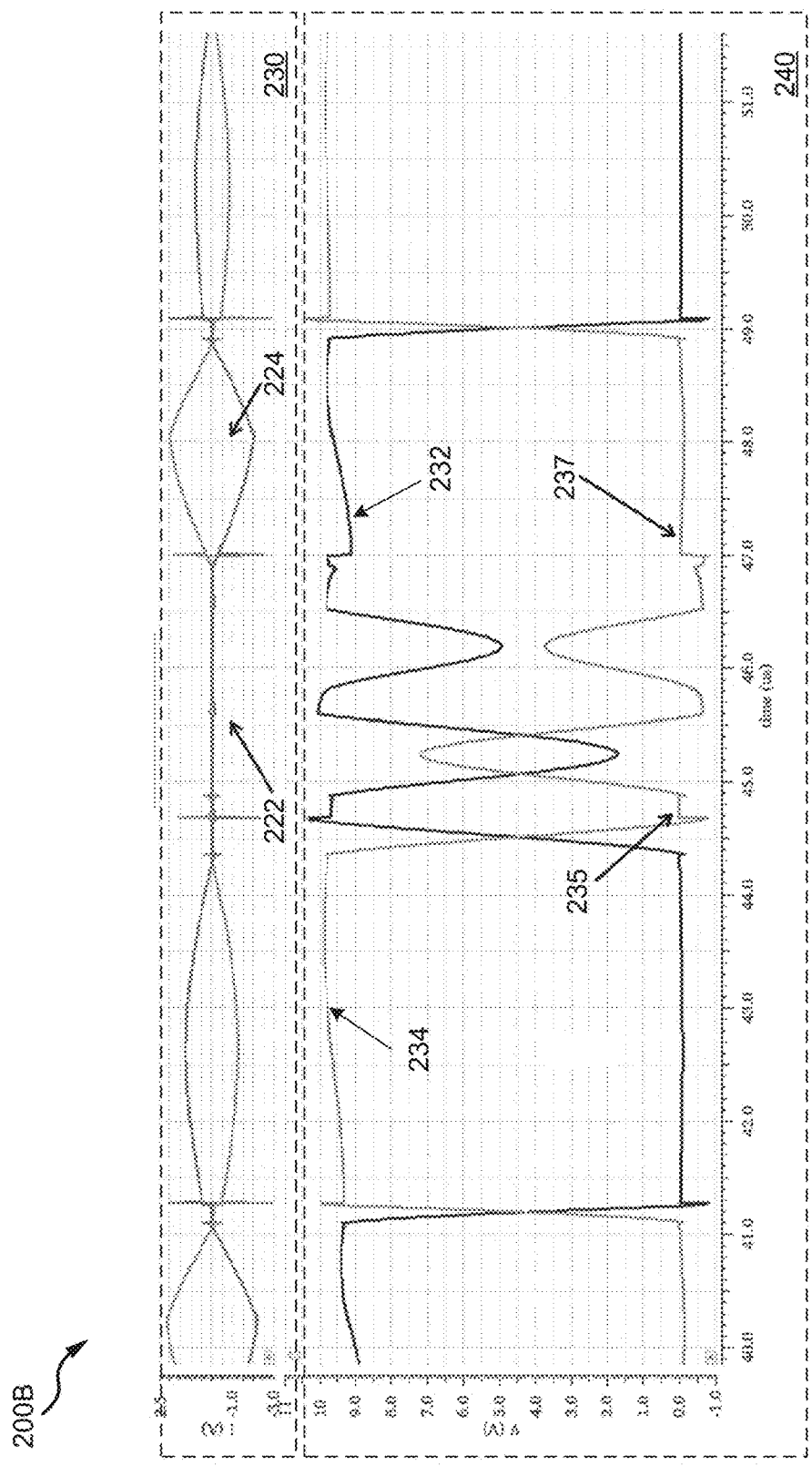

FIGS. 2A and 2B are charts illustrating examples of current and voltage waveforms of a CM rectifier 100 of FIG. 1A, in accordance with one or more aspects of the subject technology. The current waveforms of the CM rectifier 100 are shown in the chart 210 of FIG. 2A. Charts 210 and 220 of FIG. 2A are for a light load (e.g., mA range) and charts 230 and 240 of FIG. 2B are for a heavy load (thousands of mA range). The waveforms shown in the chart 210 depict currents for the first and second nodes 103 and 105 of the receive coil 106 of FIG. 1A and they are overlapping, which makes them difficult to identify. For the waveforms of FIG. 2A, the value of the reference current Iref is about 10 μA. Regions 203 and 205 indicate periods when current is delivered to the load, whereas regions 202 and 204 signify periods when the resonance current is generated by the parasitic capacitance and inductance of the receive coil 106. The voltage waveforms 212 and 214 shown in chart 220 of FIG. 2A represent voltages at the first and second nodes 103 and 105 of the receive coil 106. During the resonance periods 202 and 204 the voltage waveforms 212 and 214 indicate resonances. During these periods, resonances in the node voltages are observed, but the power FET switches (e.g., 116-2 of FIG. 1B) do not turn on. The power FET switches only turn on during time periods of regions 203 and 205 when current is delivered to the load and the voltage values are relatively stable.

Figure 3:
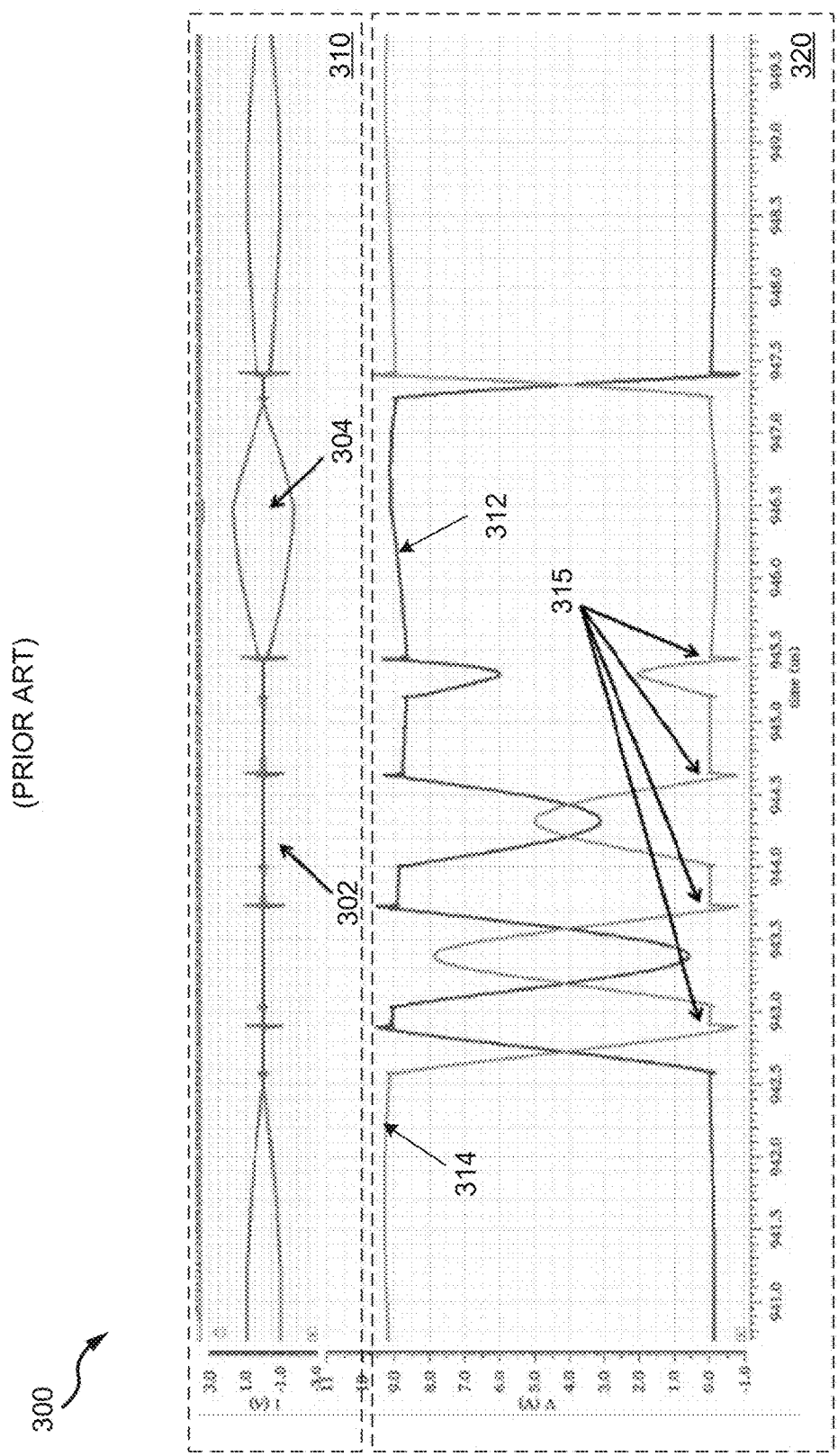
FIG. 3 is a chart illustrating examples of current and voltage waveforms of an existing integrated rectifier.

In chart 230 of FIG. 2B, the currents are delivered to the load in region 224 as discussed above. For the waveforms of FIG. 2B, the initial value of the reference current Iref is about 10 μA, which translates to a 20 mA initial and 60 mA retrigger threshold. FIG. 2B demonstrates a condition where the load is high enough that it needs a retrigger, whereas FIG. 2A demonstrates a condition where the load is too light to do so. Plots 232 and 234 represent voltage waveforms for the first and second nodes 103 and 105 of the receive coil 106. In the region 235, the initial turn on of the power FET switches is due to coil resonances. The power FET switches turn on again in region 237 when the current of the receive coil 106 exceeds retrigger threshold (e.g., about 60 mA). FIG. 3 shows charts 310 and 320 illustrating examples of current and voltage waveforms of an existing integrated rectifier. The current waveforms shown in chart 310 are similar to the current waveforms of chart 230 of FIG. 2B in region 304. Region 302 is equivalent to region 222 in chart 230, and the resonance is present in both plots. The difference, however, is that the rectifier in FIG. 3 is responding to the resonance as observed in region 315.

Further, in voltage waveforms 312 and 314 of chart 320, the resonance peaks are more pronounced and more frequent, as every time the AC signal drops below ground potential (e.g., in regions 315), the power FET switches turn on and conduct current when no power is delivered to the load. This drawback of the existing solution can result in lower efficiency and higher-power consumption, and is mitigated by the subject technology. For example, the existing solution has to use protection logic to prevent undesired and/or catastrophic combinations of wrong FET switches turning on.

Other drawbacks of the existing solutions include issues with hysteresis, one-time on and minimum on and/or off time as described herein. The issue with limited hysteresis arises because the turn-on threshold needs to be low to maximize efficiency and the turn-off threshold needs to be close to zero to minimize coil current at turn-off time, as significant current at turn off can cause rail-to-rail ringing and corrupt field-clock detection. The one-time on can prevent comparator chatter due to light loads, but the rectifier can spend a large portion of the cycle in diode mode if comparator falsely trips at the beginning of the cycle, which can cause significant efficiency degradation if false trips are periodic due to coil resonance. The minimum on/off time is used to prevent early comparator turn off due to gate transient or receive coil resonance. This can interfere with the system if the minimum on time tries to hold FET switches on after the receive-coil current switches directions.

Figure 4:
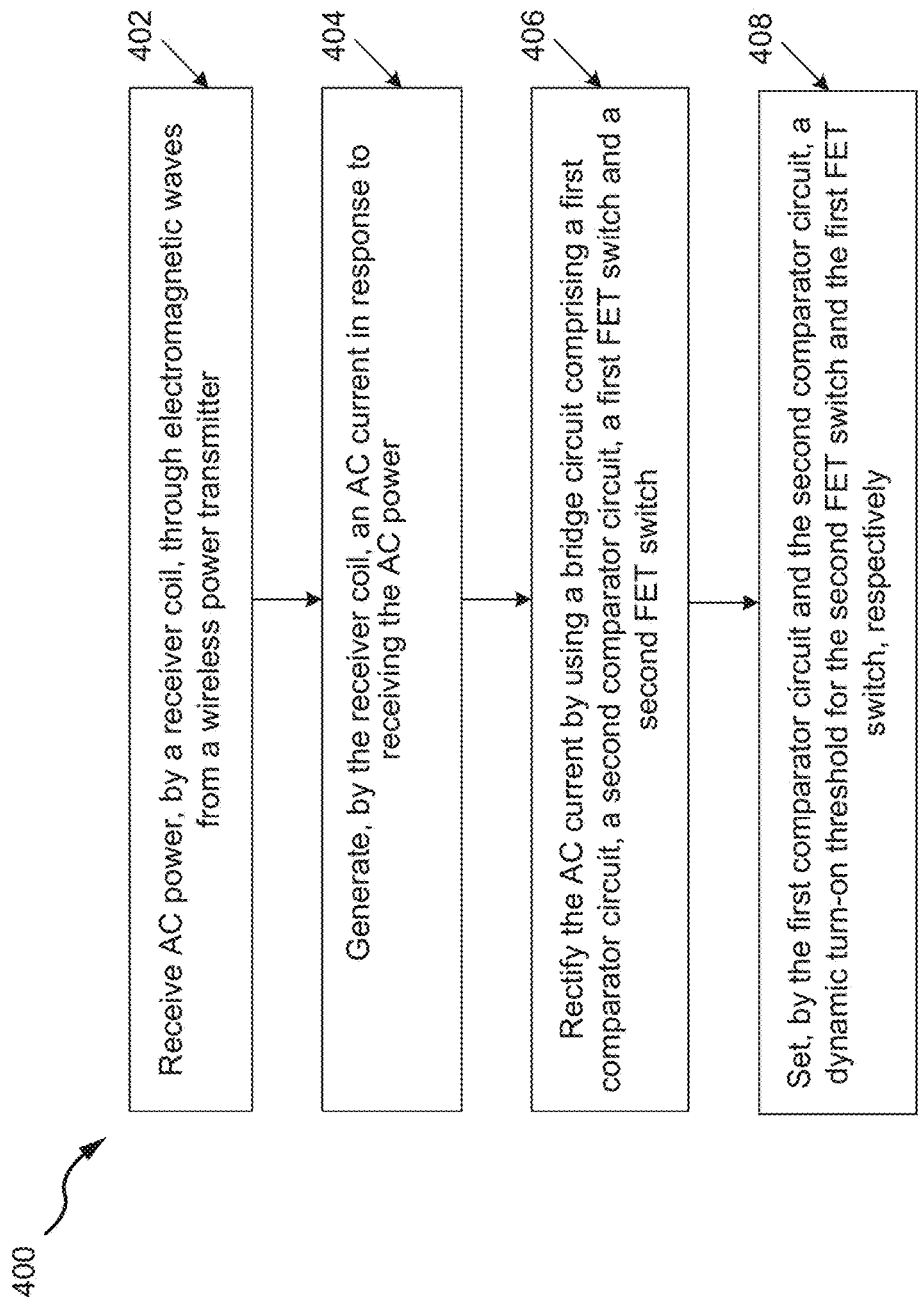
FIG. 4 is a flow diagram illustrating an example of a method of rectifying a received current using a dual-comparator current-mode rectifier, in accordance with one or more aspects of the subject technology.

FIG. 4 is a flow diagram illustrating an example of a method 400 of rectifying a received current using a CM rectifier, in accordance with one or more aspects of the subject technology. The method 400 includes receiving AC power, by a receive coil (e.g., 106 of FIG. 1A), through electromagnetic waves from a wireless power transmitter (402). The method 400 further includes generating, by the receive coil, an AC current (e.g., $I_{AC}$ of FIG. 1A), in response to receiving the AC power (404). The AC current can be rectified by using a bridge circuit (e.g., 110 of FIG. 1A) including a first circuit (e.g., 102-1 of FIG. 1A), a second circuit (e.g., 102-2 of FIG. 1A), a first FET switch (e.g., 104-1 of FIG. 1B) and a second FET switch (e.g., 104-2 of FIG. 1B) (406). The first circuit and the second circuit can set a dynamic turn-on threshold for the second FET switch and the first FET switch, respectively (408). A first branch and a second branch of four branches of the bridge circuit are coupled to a first node (e.g., 103 of FIG. 1A) and a second node (e.g., 105 of FIG. 1A) of the receive coil, and include the first circuit and the second circuit, respectively.

Figure 5:
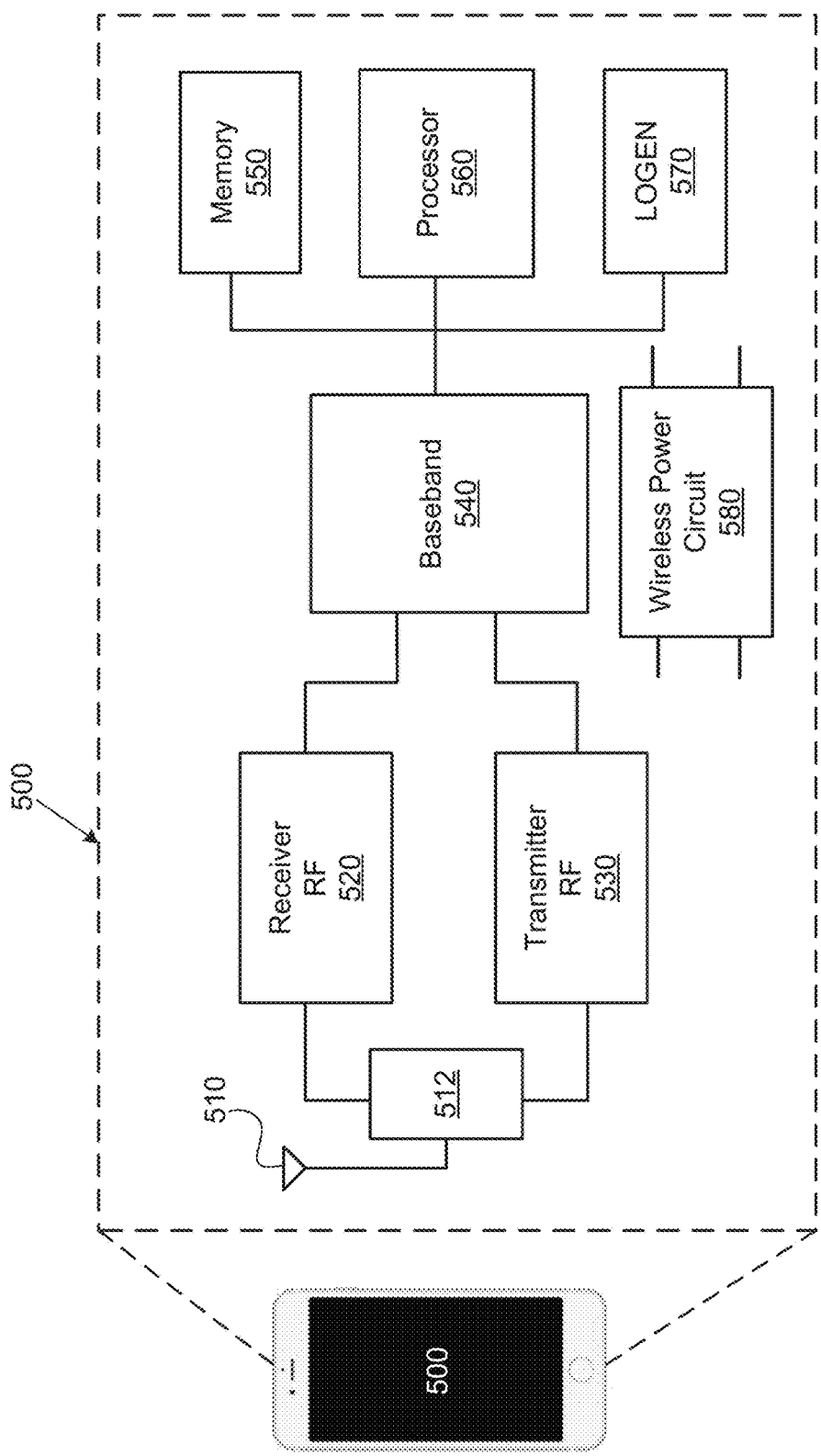
FIG. 5 is a block diagram illustrating a wireless communication device, within which one or more aspects of the subject technology can be implemented.

FIG. 5 is a block diagram illustrating a wireless communication device, within which one or more aspects of the subject technology can be implemented. In one or more implementations, the wireless communication device 500 can be a mobile phone, a tablet or any other wireless communication device that is enabled for receiving wireless power. The wireless communication device 500 may comprise a radio-frequency (RF) antenna 510, a duplexer 512, a receiver 520, a transmitter 530, a baseband processing module 540, a memory 550, a processor 560, a local oscillator generator (LOGEN) 570 and a wireless power circuit 580. In various embodiments of the subject technology, one or more of the blocks represented in FIG. 5 may be integrated on one or more semiconductor substrates. For example, the blocks 520-570 may be realized in a single chip or a single system on a chip, or may be realized in a multichip chipset.

The receiver 520 may comprise suitable logic circuitry and/or code that may be operable to receive and process signals from the RF antenna 510. The receiver 520 may, for example, be operable to amplify and/or down-convert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards, including Wi-Fi, WiMAX, Bluetooth, and various cellular standards. In various embodiments of the subject technology, the receiver 520 may not require any surface acoustic wave (SAW) filters and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to up-convert baseband signals to RF signals and amplify RF signals. In various embodiments of the subject technology, the transmitter 530 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer may be operable in multiple frequency bands of various wireless standards.

The baseband processing module 540 may comprise suitable logic, circuitry, interfaces, and/or code that may be operable to perform processing of baseband signals. The baseband processing module 540 may, for example, analyze received signals and generate control and/or feedback signals for configuring various components of the wireless communication device 500, such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control transfer of data between various portions of the wireless communication device 500. Additionally, the processor 560 may enable implementation of an operating system or otherwise execute code to manage operations of the wireless communication device 500.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various embodiments of the subject technology, information stored in the memory 550 may be utilized for configuring the receiver 520 and/or the baseband processing module 540.

The LOGEN 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals such as the frequency and duty cycle may be determined based on one or more control signals from, for example, the processor 560 and/or the baseband processing module 540.

In operation, the processor 560 may configure the various components of the wireless communication device 500 based on a wireless standard according to which it is desired to receive signals. Wireless signals may be received via the RF antenna 510, amplified, and down-converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards.

In one or more implementations, the wireless power circuit 580 includes circuits and logic for receiving power wirelessly from a wireless power transmitter. For example, the wireless power circuit 580 may use the CM rectifier with dynamic turn-on threshold of the subject technology. For instance, the wireless power circuit 580 may include a receive coil (e.g., 106 of FIG. 1A) coupled to a rectifier bridge for rectifying an AC current of the receive coil. The rectifier bridge can be the H-bridge circuit such as the bridge circuit 110 of FIG. 1A, as described above. Using the disclosed CM rectifier, the communication device 500 can benefit from low-power consumption, small chip area and the well-defined states across many operating conditions of the disclosed CM rectifier.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A word such as "aspect" does not imply that such aspect is essential to the subject technology or that such aspect applies to all configurations of the subject technology. A disclosure relating to an aspect may apply to all configurations, or one or more configurations. A word such as "aspect" may refer to one or more aspects and vice versa. A word such as "configuration" does not imply that such configuration is essential to the subject technology or that such configuration applies to all configurations of the subject technology. A disclosure relating to a configuration may apply to all configurations, or one or more configurations. A word such as "configuration" may refer to one or more configurations and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A dual-comparator rectifier circuit for a wireless power receiver, the circuit comprising:
   a receive coil configured to generate a current in response to receiving power through electromagnetic waves from a wireless power transmitter;
   a bridge circuit comprising four branches, wherein one node of each of the four branches is coupled to one of a first node or a second node of the receive coil; and
   a first branch and a second branch of the four branches coupled to the first node and the second node of the receive coil include a first circuit and a second circuit, respectively,
   wherein:
   the first circuit includes a first comparator and a first switch circuit and the second circuit includes a second comparator and a second switch circuit,
   the first circuit and the second circuit are configured to set a dynamic turn-on threshold for the first switch circuit and the second switch circuit, respectively, the first switch circuit includes a first differential pair of field-effect transistor (FET) switches including a first sense FET switch and a first power FET switch having a shared gate configured to allow the first sense FET switch to track an operating mode of the first power FET switch, and
   a common source node of the first differential pair of FET switches is coupled to the first node of the receive coil.

2. The circuit of claim 1, wherein a common gate node of the first differential pair of FET switches is coupled to an output node of the first comparator, and wherein the dynamic turn-on threshold is set for turning on the first power FET switch.

3. The circuit of claim 1, wherein input nodes of the first comparator are connected to drain nodes of the first differential pair of FET switches and to a first node of a reference current source, wherein the second node of the reference current source is coupled to a ground potential.

4. The circuit of claim 1, wherein a third branch and a fourth branch of the four branches coupled to the first node and the second node of the receive coil include a first FET switch and a second FET switch, respectively.

5. The circuit of claim 4, wherein the second switch circuit includes a second differential pair of FET switches, and wherein the first differential pair of FET switches, the second differential pair of FET switches, the first FET switch and the second FET switch are configured to stay off when no current is detected by the first comparator and the second comparator.

6. The circuit of claim 5, wherein the first differential pair of FET switches and the second FET switch are configured to turn on in response to the first comparator detecting a load.

7. The circuit of claim 1, wherein the dynamic turn-on threshold is increased after an initial value to provide additional hysteresis and to prevent false triggering due to a resonance current, and wherein the initial value is selected to reduce a turn-on time for the first switch circuit.

8. A method comprising:
receiving AC power, by a receive coil, through electromagnetic waves from a wireless power transmitter;
generating, by the receive coil, an AC current in response to receiving the AC power;
rectifying the AC current by using a bridge circuit comprising a first comparator circuit, a second comparator circuit, a first field-effect transistor (FET) switch and a second FET switch; and
setting, by the first comparator circuit and the second comparator circuit, a dynamic turn-on threshold for the second FET switch and the first FET switch, respectively,
wherein:
a first branch and a second branch of four branches of the bridge circuit are coupled to a first node and a second node of the receive coil, and include the first comparator circuit and the second comparator circuit, respectively,
the first FET switch is a first sense FET switch of a first differential pair of FET switches including a first power FET switch having a shared gate with the first sense FET switch to allow the first sense FET switch to track an operating mode of the first power FET switch, and
the method further comprises tracking an operating mode of the first power FET switch by the first sense FET switch.

9. The method of claim 8, wherein the first comparator circuit includes a first comparator and a first switch circuit and the second comparator circuit includes a second comparator and a second switch circuit, wherein the first switch circuit is similar to the second switch circuit.

10. The method of claim 8, wherein the first sense FET switch is substantially smaller than the first power FET switch.

11. The method of claim 9, further comprising setting, by the first comparator, the dynamic turn-on threshold for the first switch circuit by providing a dynamic turn-on threshold voltage for the first power FET switch at a common gate node of the first differential pair of FET switches.

12. The method of claim 8, further comprising tracking an operating mode of a second power FET switch by a second sense FET switch.

13. The method of claim 12, further comprising:
selecting an initial value for the dynamic turn-on threshold to reduce a-turn-on time for the first switch circuit; and
increasing the dynamic turn-on threshold after the initial value to provide additional hysteresis and to prevent false triggering due to a resonance current.

14. The method of claim 9, wherein a third branch and a fourth branch of the four branches coupled to the first node and the second node of the receive coil include the first FET switch and the second FET switch, respectively.

15. An apparatus for wirelessly receiving power, the apparatus comprising:
a receive coil coupled to a load through an H-bridge circuit and configured to generate a AC current in response to receiving AC power through electromagnetic waves from a wireless power transmitter, the H-bridge circuit comprising:
a first branch coupled to a first node of the receive coil, the first branch including a first circuit including a first comparator and a first switch circuit;
a second branch coupled to a second node of the receive coil, the second branch including a second circuit including a second comparator and a second switch circuit; and
a third branch and a fourth branch including a first FET switch and a second FET switch coupled to the first and second nodes of the receive coil, respectively,
wherein the first circuit and the second circuit are configured to set a dynamic turn-on threshold for the first switch circuit and the second switch circuit, respectively, wherein the first switch circuit includes a first differential pair of field-effect transistor (FET) switches including a first sense FET switch and a first power FET switch having a shared gate configured to allow the first sense FET switch to track an operating mode of the first power FET switch, and wherein the second switch circuit includes a second differential pair of FET switches including a second sense FET switch and a second power FET switch.

16. The apparatus of claim 15, wherein a common gate node of the first differential pair of FET switches is coupled to an output node of the first comparator, and wherein the dynamic turn-on threshold is set for turning on the power FET switch.

17. The apparatus of claim 16, wherein the dynamic turn-on threshold is increased after an initial value to provide additional hysteresis and to prevent false triggering due to a resonance current, and wherein the initial value is selected to reduce a turn-on time for the first switch circuit.

18. The circuit of claim 5, wherein the second differential pair of FET switches and the first FET switch are configured to turn on in response to the second comparator detecting the load current.

* * * * *